(12) United States Patent
Lieske et al.

(10) Patent No.: US 7,921,137 B2
(45) Date of Patent: Apr. 5, 2011

(54) METHODS AND SYSTEMS FOR PROVIDING SEMANTIC PRIMITIVES (75) Inventors: Christian Lieske, Wiesloch (DE); Matthias Kammerer, Karlsruhe (DE); Ilya Khandamirov, Sandhausen (DE)

(73) Assignee: SAP AG, Walldorf (DE)

( * ) Notice: Subject to any disclaimer, the term of this patent is extended or adjusted under 35 U.S.C. 154(b) by 592 days.

(21) Appl. No.: 11/182,905

(22) Filed: Jul. 18, 2005

(65) Prior Publication Data
US 2007/0016593 A1  Jan. 18, 2007

(51) Int. Cl.
G06F 7/00 (2006.01)
G06F 17/30 (2006.01)

(52) U.S. Cl. .......................... 707/802; 707/917
(58) Field of Classification Search ................ 707/103 Y
See application file for complete search history.

(56) References Cited

U.S. PATENT DOCUMENTS

| | | | |
|---|---|---|---|
| 5,887,154 A * | 3/1999 | Iwasa et al. .................. 703/6 |
| 6,209,095 B1 | 3/2001 | Anderson et al. |
| 6,233,592 B1 | 5/2001 | Schnelle et al. |
| 6,643,633 B2 | 11/2003 | Chau et al. |
| 6,647,531 B2 | 11/2003 | Isaac et al. |
| 6,671,689 B2 | 12/2003 | Papierniak |
| 6,745,208 B2 | 6/2004 | Berg et al. |
| 6,748,569 B1 | 6/2004 | Brooke et al. |
| 6,781,609 B1 | 8/2004 | Barker et al. |
| 6,782,379 B2 | 8/2004 | Lee |
| 6,817,008 B2 | 11/2004 | Ledford et al. |
| 6,829,745 B2 | 12/2004 | Yassin et al. |
| 6,832,351 B1 | 12/2004 | Batres |
| 7,051,071 B2 * | 5/2006 | Stewart et al. .................. 709/204 |
| 7,308,508 B1 * | 12/2007 | Dewa ............................ 709/247 |
| 2003/0163784 A1 * | 8/2003 | Daniel et al. .................... 715/514 |
| 2004/0003097 A1 * | 1/2004 | Willis et al. .................... 709/228 |
| 2005/0246341 A1 * | 11/2005 | Vuattoux et al. .................. 707/9 |
| 2010/0114898 A1 * | 5/2010 | Wasserman et al. ............ 707/741 |

OTHER PUBLICATIONS

Day et al, "Introduction to the Darwin Information Typing Architecture," retrieved on Jun. 26, 2003 from <http://www-106.ibm.com/developerworks/library/x-dita1/>, pp. 1-10.

* cited by examiner

*Primary Examiner* — Pierre M Vital
*Assistant Examiner* — Rachel J Lee
(74) *Attorney, Agent, or Firm* — Finnegan, Henderson, Farabow, Garrett & Dunner, LLP (57) ABSTRACT

Methods and systems consistent with certain aspects of the present invention may manage the generation, modification, and publication of documents. In one aspect, a computer-implemented method is disclosed for managing documents implemented in a business processing chain. The method may include receiving a request from a first computing entity to generate a document for electronic publication and determining, by a second computing entity, a first object to be included in the document. The method may also include analyzing, by the second computing entity, a first semantic primitive associated with the first object, the first semantic primitive reflecting a class describing a characteristic of the first object and being stored in a document definition associated with the document. Further, the method may include generating, by the second computing entity, a first document model based on a result of the analysis, wherein the first document model and document definition are used to publish the document.

16 Claims, 3 Drawing Sheets

METHODS AND SYSTEMS FOR PROVIDING SEMANTIC PRIMITIVES

TECHNICAL FIELD

The present invention generally relates to content management systems and, more particularly, to systems and methods providing semantic primitives for content management systems.

BACKGROUND

The advent and growth of computer networks enables businesses to provide customers and other businesses access to documents from an increasing number of network-based resources, such as Web servers, database servers and enterprise systems. To maintain proper business practices, a business must ensure not only that information published in these documents is accurate, but also that the information is suitable for the purpose which it is provided, such as the price of a product is matched with the correct product in a product catalog. To this end, businesses typically rely on content management systems to control the publication of documents associated with their business.

One type of a content management system is a software-based system that executes processes for managing content for electronic publishing. It supports a variety of document formats and provides access to content generated by different entities. Although this versatility makes a content management system an ideal resource publishing documents in a network environment, problems may arise when synchronizing documents obtained from separate sources. This problem is aggravated when modifications to documents are not limited to a single piece of information, but to an entire class of information in a business processing chain. For example, a change to data to a first document may require a similar or different change to a second document implemented by the processing chain. Thus, there is a need to provide an efficient way of communicating changes to documents across various entities of a business and its business processing chain such that the changes are synchronized among the various documents impacted by the change. Further, there is a need for an efficient manner of enforcing relationships between information included in documents implemented by a business processing chain to ensure valid information is published with a document.

SUMMARY

Methods and systems consistent with certain aspects of the present invention may manage the generation, modification, and publication of documents. In one aspect, a computer-implemented method is disclosed for managing documents implemented in a business processing chain. The method may include receiving a request to generate a document for electronic publication and determining a first object to be included in the document. The method may also include analyzing a first semantic primitive associated with the first object, the first semantic primitive reflecting a class describing a characteristic of the first object and being stored in a document definition associated with the document. Further, the method may include generating a first document model based on a result of the analysis, whereby the first document model and document definition are used to publish the document.

In another aspect of the invention, a system is disclosed for managing documents in a business processing chain associated with a first and second entity affiliated with a business entity. The system may include a first computing system associated with the first entity and configured to generate a first object representing a document that references a second object. The first and second objects may be associated with a semantic primitive reflecting a class describing a characteristic of the respective object. The system may also include a second computing system associated with the second entity and configured to generate the second object. Further, the system may include a third computing system configured to generate a document model based on the semantic primitives of the first and second objects and publish a document based on the document model. In certain aspects, the third computing system may modify the publication of the document based on a change to any one of the first and second semantic primitives.

BRIEF DESCRIPTION OF THE DRAWINGS

The accompanying drawings, which are incorporated in and constitute a part of this specification, show certain aspects of the present invention and, together with the description, help explain some of the principles associated with the invention.

DETAILED DESCRIPTION

The following description refers to the accompanying drawings in which the same numbers in different drawings represent similar elements unless otherwise represented. The implementations set forth in the following description do not represent all implementations consistent with the claimed invention. Instead, they are merely examples of systems and methods consistent with certain aspects related to the invention.

Overview

The present invention is directed to methods and systems for providing semantic primitives describing characteristics of content objects (e.g., data associated with a document) implemented in a business processing chain. A business processing chain may be a process implemented by a business entity for performing business processes, such as managing tasks between business sub-entities and customers, and creating, modifying, and/or managing documents for electronic publication. A business processing chain may be associated with various types of components, such as sub-entities of a business entity, rules and constraints associated with each sub-entity with regard to documents implemented by the processing chain, and the relationships between the sub-entities and information used in publishing the documents. For example, a business processing chain may be implemented by a business entity that includes several sub-entities, each tasked with various roles associated with operations of the business entity. Each sub-entity may be tasked with producing data (e.g., content) that may be shared among the sub-entities to create a document including respective data provided by selected sub-entities. For instance, a first sub-entity may be tasked with generating a document, such as a financial report associated with the business entity. The first sub-entity may define what information is to be included in the document, such as asset information and liability information. A second sub-entity may be tasked with generating and managing the liability information and a third sub-entity may be tasked with providing the asset information. A business processing chain may be a process model for representing and controlling how these various entities, and the information they generate and manage, relate and interact to publish the document based on the various constraints and rules pertinent to each sub-entity. Although the above example describes processes associated with publishing documents, other types of services may be included in the business processing chain.

In one aspect, a business processing chain associated with publishing documents may be implemented by a content management system. A content management system may be a computing system executing software processes (or software executed by a computing system) that manages document-related processes, such as creating, editing, storing, translating, validating, and publishing documents. The content management system may manage these processes based on information, rules, constraints, etc. implemented by each component in the business processing chain. In one aspect of the present invention, a content management system may implement object-oriented markup languages such as eXtensible Markup Language (XML) or Standard Generating Markup Language (SGML) to define characteristics of how documents are to be published. In such aspects, the content management system may use these languages to create and store information as discrete "objects" that, like building blocks, may be assembled into different documents.

Different types of objects may be implemented to create a document. For example, a first type of object may reflect data (e.g., content) that may be referenced by a document, such as text, graphics or hyperlinks. A second type of object may define relationships between other objects, such as references to and/or from another object. A third type of object may define document constraints on, for instance, document type definitions or schema. Each object may include content and metadata. Content may be data representing any type of information that may be provided in a document, such as text, graphical information, etc. Metadata may describe one or more characteristics of the object, such as its content. Based on the metadata, methods and systems manage references by a document to particular objects. In a typical XML document, metadata may describe the identity of an object, the type of content an object contains, and/or a description of purpose for the object when referenced by a document.

In accordance with certain aspects of the present invention, objects may include metadata that reflect external constraints with respect to the business processing chain. For instance, certain aspects of the invention enable a content management system to generate semantic primitives that are associated with the metadata of an object. Each semantic primitive reflects the object's relationship with the business processing chain. For example, a semantic primitive may reflect an object class describing an object's relationship with certain levels of a business processing chain, such as an editing level object, a storage level object, a translation-level object, or a publishing-level object. By formalizing metadata to include semantic primitives, information describing both characteristics of an object and its relation to a document and to the business processing chain may be leveraged when generating and publishing documents. Aspects of the present invention maintain information regarding business process rules in content models that are reflected by the semantic primitives. Accordingly, for example, semantic primitives enable a content management system to avoid having to reference multiple locations or upload changes to different locations each time a change occurs in a document implemented by a business processing chain.

In certain aspects, semantic primitives include information that classifies objects with regard to the business processing chain. For example, semantic primitives may enable a content management system to reference objects based on, for example, the object's level in the process chain, compositionality, editing characteristics, relationship characteristics, content characteristics, and system relationships. In one aspect, semantic primitives may reflect characteristics associated with various concept levels, such as a feature class, a feature, and a feature level concept. A feature class concept may be a set of characteristics related to a particular business processing chain entity or aspect, such as editing, storage, translating, and publishing). A feature concept may be a characteristic of a set of objects, such as a class-level characteristic, or a n individual object, such as an instance-level characteristic). A feature value concept may be a specific embodiment of a feature concept. for example, aspects of the present invention may implement a semantic primitive that is associated with a feature value concept defining an object as one that should become a publishing level unit in the form of a Web page during publishing processes performed by a publishing entity of the business processing chain.

In another aspect, semantic primitives may enhance the synchronization of changes in the business processing chain to each object commonly referenced by different documents. For example, if two documents include objects associated with a semantic primitive, then changing the semantic primitive may reflect the change in the two documents, and any other documents generated by the business processing chain according to the semantic primitive.

In another aspect, methods and systems may use semantic primitives to enforce relationships in a business processing chain by preventing users or processes from performing operations inconsistent with an object's classification. For instance, based on a semantic primitive, an object's content may be classified as confidential. When business processing chain publishes a public document referencing the confidential object, the content management system may prevent the inclusion of the object in the document.

Moreover, semantic primitives may identify a purpose of an object in a business processing chain. For example, a user or a computer executed process translating content of a document to a different publishing may require information reflecting which of its referenced objects should be incorporated into an Hypertext Markup Language (HTML) page. Aspects of the present invention enable a process or user to access the semantic primitives of each object referenced by the document to determine the object's classification, and thus the publication format.

Semantic primitives may also assist in configuring a content management system. For instance, aspects of the present invention enable a user or software executed process to define classes of objects that are administered by the content management system. For example, a general class may be defined for all types of graphics objects and two different classes defined for XML objects (e.g. one for conglomerates/book-like objects and one for pebbles/topic-type objects). In some instances, objects to be managed by the content management system may have specific requirements that require the creation of many classes. Aspects of the present invention leverage semantic primitives to enable a content management system to share information regarding the specific requirements associated with the objects. By encoding object requirements in a semantic primitive, aspects of the present invention may automatically transform the encoded requirements in the semantic primitives into configuration settings for the content management system.

Exemplary System Environment

Figure 1:
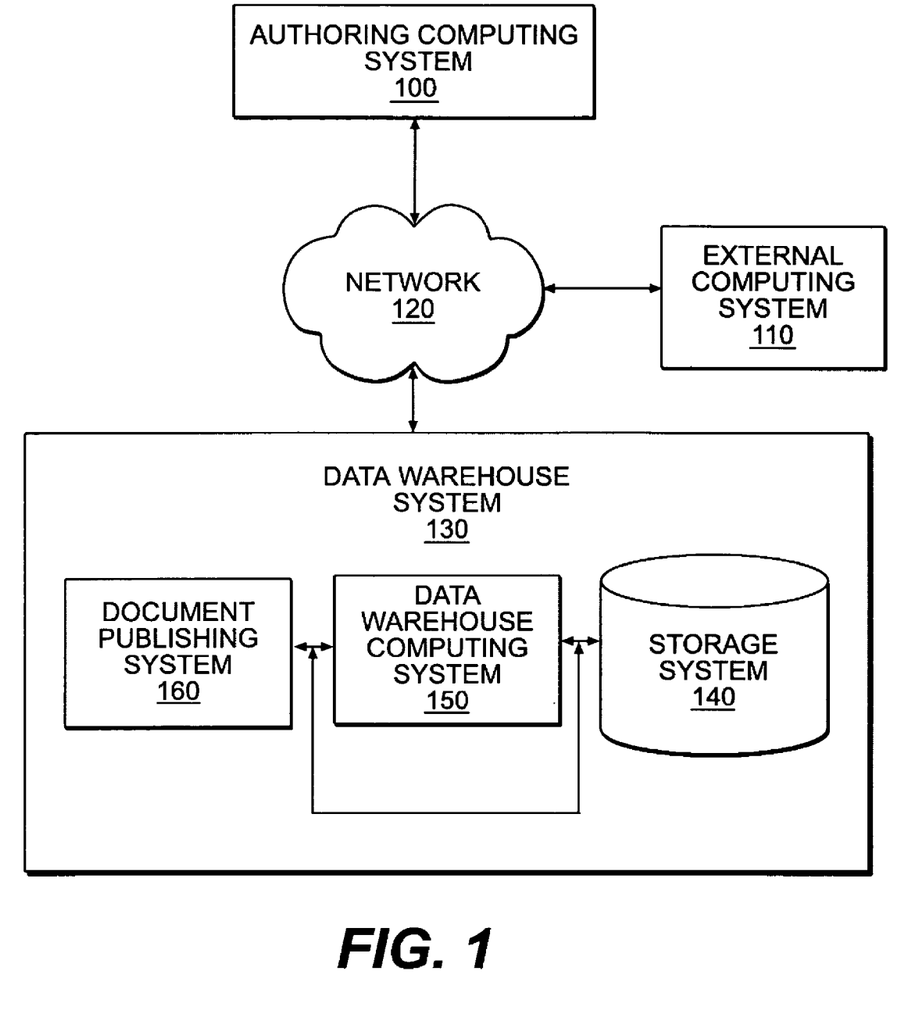
FIG. 1 illustrates a block diagram of an exemplary system environment consistent with certain aspects related to the present invention.

FIG. 1 shows a block diagram of an exemplary system environment consistent with certain aspects related to the present invention. As shown, the system environment may include authoring computing system 100, external computing system 110, network 120, and data warehouse system 130.

Authoring computing system 100 may be one or more computer systems that perform computer executed processes consistent with certain aspects related to the present invention. For instance, authoring computing system 100 may include components consistent with computing systems, such as processor(s), memory, and input/output devices that enable a user to create and edit documents via software that is executed by system 100. In one aspect, authoring computing system 100 may execute one or more software processes for creating and transferring data, such as document content, to data warehouse system 130 via network 120 for storage in storage system 140.

External computing system 110 may be one or more computer systems that perform computer executed processes. It may include components consistent with computing systems, such as processor(s), memory, and input/output devices that enable a remote systems and/or users to create and edit documents. Further, external computing system 110 may execute one or more software processes that exchange data with data warehouse system 130 via network 110. In one aspect, the external computer system 110 may be a third-party content provider who provides data (e.g., document content) to data warehouse 130.

Network 120 may be one or more communication networks that facilitate communications between authoring computing system 100, external computing system 110, and data warehouse system 130. Depending on the configuration of the system environment shown in FIG. 1, network 120 may include one or more of an Extranet, an Intranet, the Internet, a Local Area Network (LAN), Wide Area Network (WAN), public switch telephone network, Integrated Services Digital Network (ISDN), radio links, Global System for Mobile Communication (GSM), and any other form of wired or wireless communication networks. Accordingly, network 120 may be compatible with any type of communication protocol used by the components of the system environment to exchange information, such as Transmission Control/Internet Protocol (TCP/IP), Hypertext Transfer Protocol (HTTP), Wireless Application Protocol (WAP), Wireless Markup Language, etc.

Data warehouse system 130 may be a computing system that includes one or more computers that execute one or more software processes consistent with certain aspects related to the present invention. In one aspect, data warehouse system 130 performs processes consistent with a content management system. Thus, data warehouse system 130 may execute content management system process for receiving content created and/or edited by processes or users, storing the content, retrieving the content upon request, and transforming the content into documents for publication. In one aspect, data warehouse system 130 may include storage system 140, a data warehouse computing system 150, and a document publishing system 160.

Storage system 140 may be one or more data storage devices that manage and store data retrieved by data warehouse system 130 to create, edit, and publish documents. For example, storage system 140 may store extensible Markup Language (XML) objects including shell, schema, style sheets, and other content created by entities 202-208 for the business processing chain. A shell object may represent an object including a group of objects that may be referenced to form the shell object.

Data warehouse computing system 150 may be one or more processing systems that execute content management system software for managing, generating and validating documents in a descriptive language format, such as XML. Data warehouse computing system 150 may interface with other components of data warehouse system 130, including storage system 140, and document publishing system 160. Further, data warehouse computing system 150 may interface with components remote to data warehouse system 130. For example, data warehouse computing system 150 may exchange data with authoring computing system 100 and external computing system 110 via network 120.

Document publishing system 160 may be one or more computer systems that perform processes for publishing documents created by data warehouse computing system 150 in a target format. For instance, document publishing system 160 may access eXtensible Stylesheet Language (XSL) style sheets for rendering documents in HTML or PDF. Other types publishing software may be implemented by document publishing system 150 for rendering data (e.g., content) included in a document for publication.

Exemplary Business Processing Chain

Figure 2:
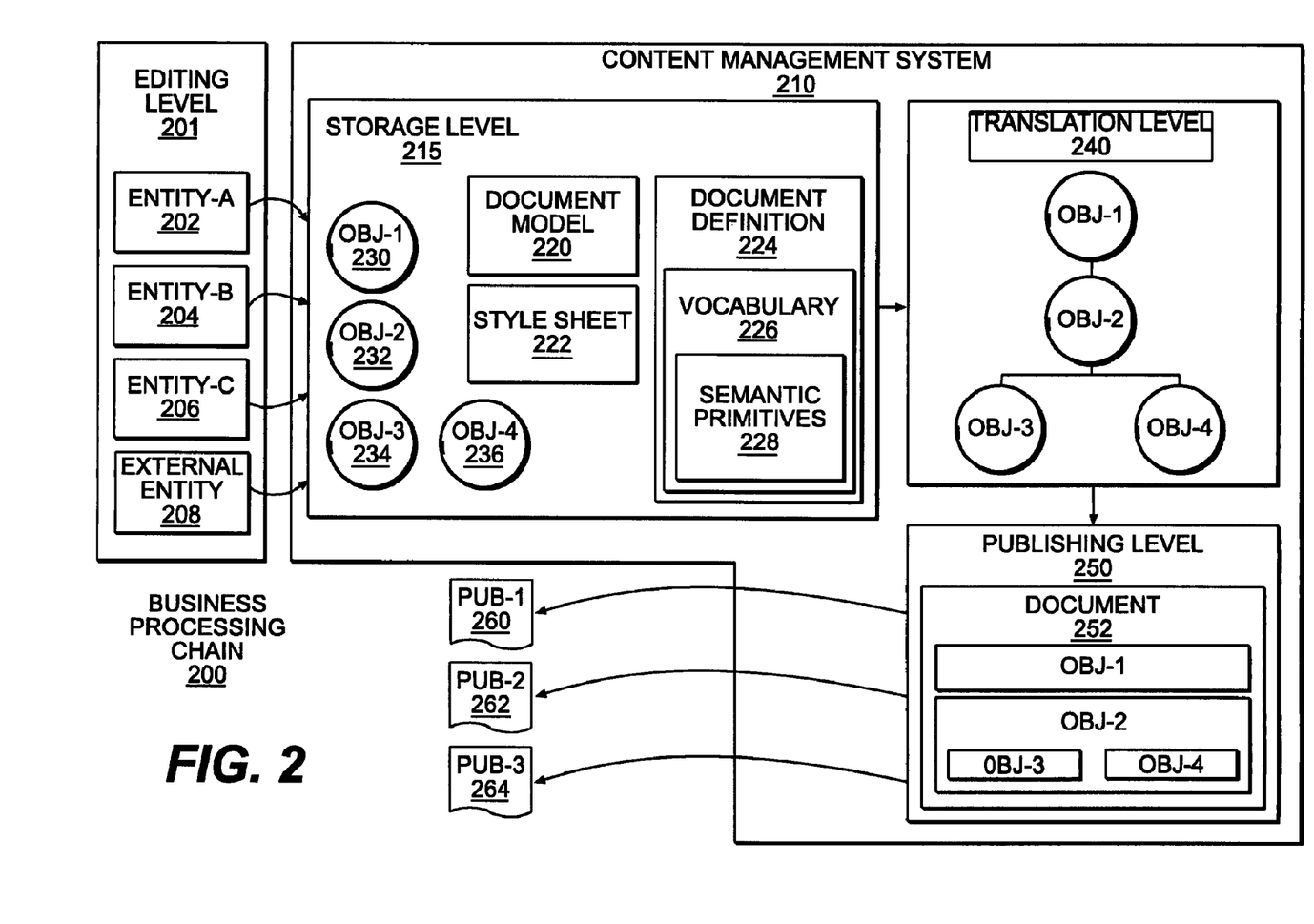
FIG. 2 illustrates an exemplary business process chain consistent with certain aspects related to the present invention.

To better illustrate certain aspects related to the present invention, FIG. 2 shows a block diagram of an exemplary business processing chain 200. Business processing chain 200 reflects a model of a process for generating and managing publication documents 260-264 through the assembly of objects 230-236 created and/or edited by business entities 202-208, which may be sub-entities of a business entity. As shown, business processing chain 200 may include multiple processing chain levels including an editing level 201, a storage level 215, a translation level 240, and a publishing level 250. Aspects of the present invention may include fewer or additional processing chain levels representing different components of a business processing chain. While business processing chain 200 represents a process model, components of the processing chain may represent hardware and/or software implemented by one or more of the components shown in FIG. 1 or other computing environments.

Editing Level

Editing level 201 may represent a level where entities 202-208 create and/or edit objects 230-236 used in generating documents implemented by business processing chain 200. Entities 202-208 may reflect business sub-entities that execute processes for creating and editing documents and/or objects, such as authoring computing system 100 and/or external computing system 110. Further, entities 202-208 may provide information associated with generated documents and/or object information over network 120 to document warehouse system 130 for generating one or more documents. Although FIG. 2 shows editing level 201 outside content management level 210, aspects of the present invention contemplate editing level being configured within content management level 210.

Storage Level

At storage level 215, content management system 210 may receive, store, process, and manage objects 230-236. For instance, components of editing level 201 (e.g., entities 202-208) may provide one or more of objects 230-236 to components of storage level 215 (e.g., data warehouse system 130)

for storage in storage system 140. Alternatively, entities 202-208 may create and store one or more of objects 230-236. Content management system 210, or other process or computing components, may send a request for any objects generated by components of editing level 201 (e.g., entities 202-208). Alternatively, editing level 201 components may automatically provide generated objects.

In storage level 215, content management system 210 performs one or more processes based on information associated with objects 230-236. This information may include, for example, one or more document models 220, style sheets 222, and document definitions 224. Document model 220 may be software, such as an interface, that allows programs and scripts to dynamically update the content, structure, and style of documents, such as document 252. Content management system 210 generates a document model 220 for each document to be published by document publishing system 160. Object relationships may include references between objects, associations between classes or sub-classes of objects (e.g., object 234 may be defined within the class of objects reflected by object 230), object metadata that include similar information (e.g., same class, same field information, etc.), and any other form of relationship that content management system 210 may use to relate objects with each other to form a document.

Style sheet 222 may represent one or more document descriptions that define what content is to be rendered in a document and the format of that content. Content management system 210 may reference and use one or more style sheets 222 to identify what content is to be used when editing or generating a document and define the layout of the document when published. For example, style sheet 222 may represent format descriptions, such as margins, tabs, fonts, headers, footers, and other layout information. One or more documents may be associated with one or more style sheets 222.

Document definitions 224 may define rules and constraints associated with the format of a document. For example, document definitions 224 may define tags and metadata used to describe content included in a Standard Generalized Markup Language (SGML), XML, or HTML document. Document definitions 224 may also define the location of these tags and constraints in relation to other tags (e.g., which tags can appear within other tags). Thus, when creating a document or object, document definitions 224 may control where tags can be placed within the document or object maintaining consistency of the format of documents bound by document definitions 224. Changes to the format of the document may be made by modifying the document definitions 224. In one aspect, document definition 224 may include information that content management system 210 uses to form document model 220. This information may include data that identifies which, if any, of objects 230-236 may be used for assembly into a document, such as document 252. That is, document definition 224 may define the content of document 252 by identifying and/or limiting the type of objects that may be included in the document based upon the metadata of objects 230-236. For instance, document definition 224 may limit the format of numerical values that may comprise a calendar date in a document 252. By referencing a document 252 against document definition 224, content management system 210 may analyze whether a generated document (e.g., document 252) follows valid constraints set forth by components of business processing chain 200 through object metadata and other information associated with the formation of documents.

The structure and data (e.g., content) included in document definition 224 may be further specified through document vocabulary 226, which defines the objects and data required for a particular document to be published, such as document 252. Document vocabulary 226 may define the information used for forming the published document, such as required object types, object metadata, and rules for their combination in forming the document.

Consistent with certain aspects of the present invention, vocabulary 226 may be configured to include one or more semantic primitives 228 that provide information associated with business processing chain and particular objects used in a document. Semantic primitive 228 may define one or more classes of objects that describe information regarding the purpose and use of a particular information that is associated with these classified objects. By associating objects 230-236 with one or more semantic primitives 228, content management system 210 may enforce constraints on objects 230-236 referenced by document model 220 with respect to the business processing chain 200.

In one aspect of the present invention, semantic primitives may reflect object classes describing an object's relationship with certain levels of the business processing chain. For instance, a semantic primitive class may classify an object as an editing level object, a storage level object, a translation-level object, or a publishing-level object.

A semantic primitive editing-level class may, for example, describe an object based on its source of origination (e.g. authoring computing system 100). Further, an editing level class may describe the object as being generated from a particular software process (e.g., software application). A storage-level semantic primitive class may define an object as being used for storage purposes. For example, a semantic primitive class may define an object as an XML storage unit having one or more root objects that are stored as data files. A translation-level semantic primitive class may define an object as being used for translation purposes in a translation level of a business processing chain. For instance, a translation level semantic primitive class may describe an object's relationships in accordance with a document model that defines how content management system 210 should combine objects into a document. A publishing-level semantic primitive class may describe an object as being used for publishing purposes. For example, an object belong to a publishing level semantic primitive class may describe the object's association with a style sheet or information associated with how the object is to be formatted in a document.

In another aspect of the present invention, semantic primitives may classify objects based on storage or editing relationships. Storage or editing relationship semantic primitive classes may describe an object as including editable content, reusable content, and content conglomerates. An editable content semantic primitive class may describe the objects as one capable of being edited, in whole or in part. A reusable content semantic primitive class may describe an object as including data that is reusable by other objects or processes, such as when an object is a target of a of hyperlinks or the object may be included in a shell object. A content conglomerate semantic primitive class may describe an object as one comprised of other objects.

Additionally, semantic primitives may classify objects based on their content characteristics. For instance, a semantic primitive class may describe an object as including template information, such as fixed phrases or text that may be referenced by other objects or processes. Another semantic primitive class may define an object as including data provided from an external source (e.g., remote from data warehouse system 130), such as external computing system 110. Other semantic primitive classes may include a class that describes an object including data that is presented on a user interface, for instance, exemplary field names or explanatory short text describing some information associated with the object. Another semantic primitive class may define an object as including graphical representations.

In another aspect, semantic primitives may classify an object based on the object's data characteristics. For example, a semantic primitive class may be implemented that describes an object based on its association with a document style, a document definition, schema, another object not associated with a document definition, another object that is associated with a document type definitions, or an object that is associated with a document model. Conversely, a semantic primitive class may be implemented that describes the object as having no association with a document definition, document-type definition, or schema. Further, a semantic primitive class may be implemented that describes the object as being associated with document layout information, such as stylesheets. Also, a semantic primitive class may be implemented that describes an object including data that is rendered in the content frame of an extended hypertext markup language environment, an object being referenced by a public entity (e.g., an entity not affiliated with the business entity implementing the business processing chain), and as an object used for linking to other objects or data.

Moreover, a semantic primitive class may be implemented that describes an object based on its data (e.g., content), such as an object supplemented with data drawn from a particular source. A compositionality semantic primitive class may be implemented that describes an object as having a certain type of data. Other semantic primitive classes may include a class that describes an object based on the graphical format of the object's content, such as JPEG, GIF, or MICROSOFT® POWERPOINT® type content.

Aspects of the present invention leverage the semantic primitive classes to enforce constraints on documents that reference each of the object's maintained by content management system 210. For instance, a document being assembled may include an object belonging to a semantic primitive class that places constraints on the use of the object, such as including proprietary information. Relationships between objects and their association with semantic primitive classes may enforce these constraints by, for example, preventing use of the private object from being published in a public document.

Translation Level

In translation level 240, content management system 210 may assemble one or more objects 230-236 into an output document for publication. For example, content management system 210 may reference document model 220 associated with a particular document (e.g., document 252) to determine which of objects 230-236 may be included in the output document and the relationship between the selected objects.

Publishing Level

In publishing level 251, content management system 210 may convert a document to be published into a display format based on the document model referenced in translation level 240. For instance, content management system 210 may convert document 252 into a format for display to users operating computing systems that have access to published documents, such as a Web site, file storage, etc. As shown in FIG. 2, document 252 includes objects 230-236 positioned in selected areas of document 252 based on the relationships and object information defined in document model 220 associated with document 252. Publication documents 260-264 represent converted forms of documents that have been produced by document publication system 160. For example, content management system may convert document 252 into a particular formats, such as HTML or Portable Document Format (PDF), which are provided for access by processes and/or users over a computer network, such as network 120.

Although FIG. 2 shows four levels of business processing chain, aspects of the present invention may implement greater or fewer levels as required by a business processing chain of a business entity.

Managing Documents Based on Semantic Primitives

Figure 3:
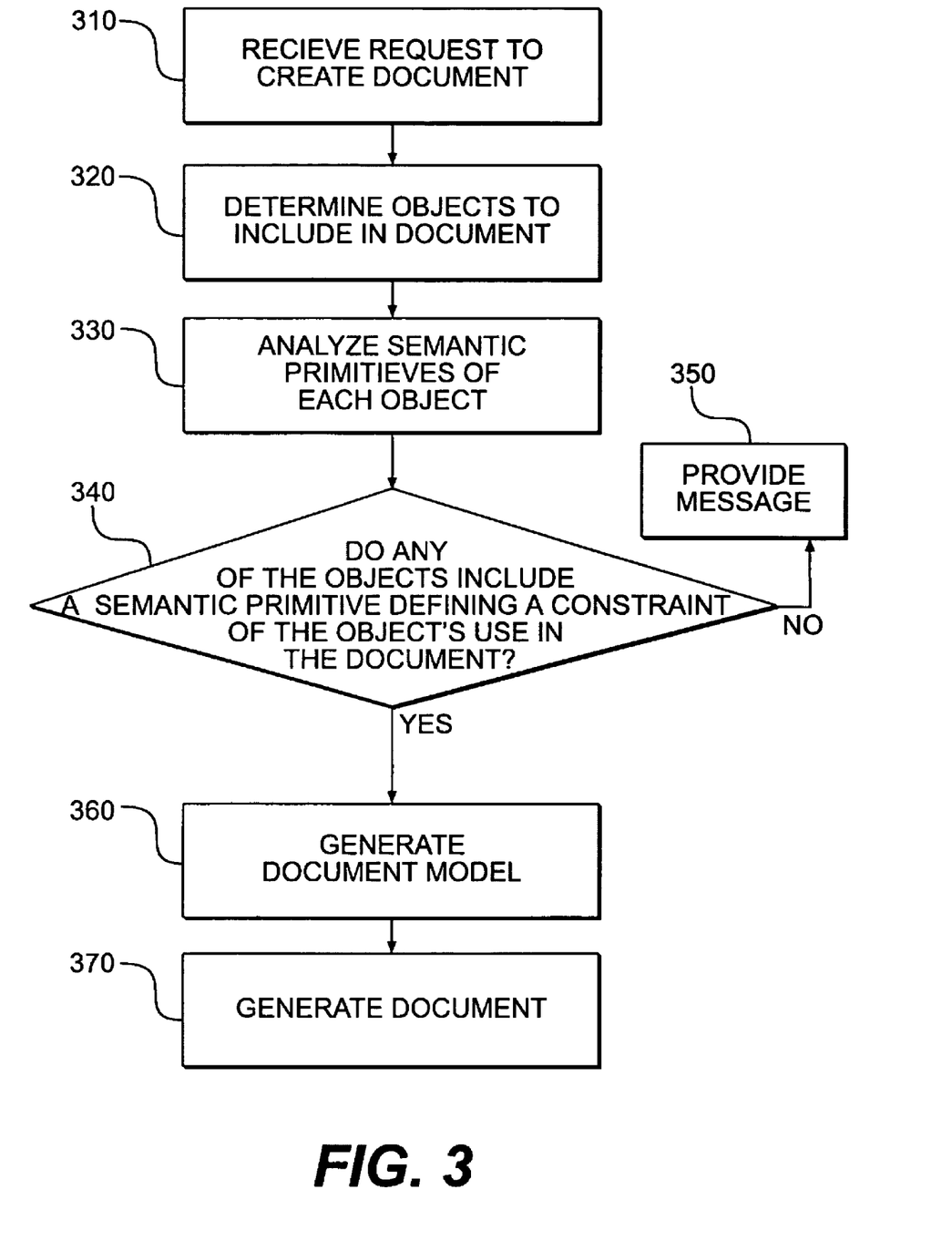
FIG. 3 illustrates a flowchart of an exemplary process for generating a document based on semantic primitives, consistent with certain aspects related to the present invention.

As described, aspects of the present invention enable a business entity to manage the creation, modification, and publication of documents. According to certain aspects of the present invention, semantic primitives are implemented to provide declarative and explicit information regarding each object used by content management system 210 and to ensure changes to one or more objects are reflected in all appropriate documents referencing these objects. To better describe these aspects of the present invention, FIG. 3 shows a flowchart of an exemplary process for generating documents including one or more objects associated with semantic primitives. Initially, at step 310, authoring computing system 100 may request to form a document from one or more objects maintained by data warehouse system 130 and managed by content management system 210. Based on the request, content management system 210 may determine the objects to include in the document (320). Once determined, content management system 210 may analyze the semantic primitive information associated with each selected object (Step 330). Based on the analysis, content management system 210 may determine whether one or more of the objects belong to a semantic primitive class that defines a constraint on the objects' use with other objects in the document or in the document template itself (Step 340). If so (Step 340; Yes), content management system 210 may generate a message indicating the conflict (Step 350) and the process may end. In another aspect of the invention, the document may be published in accordance with the determined constraints. If there is no constraints (Step 340; No), content management system may form a document model based on the object's metadata and the semantic primitive of each object (Step 360). The document may then be published in accordance with the document model and associated document definition (Step 370). Thus, semantic primitives provide a mechanism for users or software processes to identify characteristics of certain objects when building documents. By reviewing the semantic primitive of an object's metadata, the user or software process may identify certain constraints, identifying information, and characteristics associated with the object. In certain aspects, the information related to the semantic primitives of the document may be removed from the document prior to publishing.

Once a document model and associated document definition is generated, the document may be regenerated and published each time it is requested. Aspects of the present invention ensure that any subsequent changes to a document or its objects are reflected across all instances of the document or the object. For instance, content management system 210 may receive a request to modify an object (or a document template). Aspects of the present invention allow the change to be reflected in every document that references the modified object by updating the semantic primitive for the modified object. For example, consider a document reflecting a financial statement of a business entity including two objects; an assets object and a liabilities object. Each object includes content specific to its purpose. For example, the assets object may includes data reflecting the business entity's assets and the liabilities object includes data reflecting liabilities of the business entity. Each object may belong to one or more semantic primitive classes based on its defined object metadata provided by, for example, one of entities 202-208. For example, both the assets and liabilities objects may belong to a semantic primitive class that classifies each object as a reusable object (i.e., an object that may be referenced and used by other objects or processes). Suppose subsequent to these definitions, a user or software process executed by a computer determines that the liabilities object is no longer allowed to be published in public documents. As a result, the financial statement document (a public document) is no longer allowed to include the liability information. To effectuate this change, aspects of the present invention enable content management system 210 to update the semantic primitive for the liabilities object to reflect it is either no longer a member of the reusable class, or that it is now classified as an object that is not allowed to be referenced by certain types of objects, such as ones that are for public publication, etc. Because the semantic primitive for the liabilities object is included in the vocabulary of the document definition for the financial statement document, any subsequent requests to retrieve and publish that document will result in content management system 210 rendering an updated document without the liabilities object. Further, any other documents that may reference the liabilities object is similarly updated because content management system 210 will reference the semantic primitive of the liabilities object when forming any document including that object.

Accordingly, the document model for a document that includes an object that has been modified via its semantic primitive is modified accordingly. Thus, each time a document is requested for publication, content management system 210 may access the document model for the requested document, along with its corresponding document definition information, to publish the document. Modifying the semantic primitives of an object affects the use of that object in all documents and document models that reference that object. Thus, changes to documents and/or objects are synchronized across a business processing chain and the business entity through the modification of semantic primitives.

CONCLUSION

Variations of the methods and systems consistent with features of the present invention previously described may be implemented without departing from the scope of the invention. Further, methods, systems, and articles of manufacture, consistent with features of the present invention may be implemented using various types of computing elements and platforms, and is not limited to a particular computer and/or network environment. Furthermore, methods, systems, and articles of manufacture, consistent with features of the present invention are not limited to the implementation of systems and processes compliant any particular type of programming and/or formal language. Any number of programming or formal languages may be utilized without departing from the scope of the present invention.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A computer-implemented method for managing documents implemented in a business processing chain, comprising:
   receiving a request to generate a document for electronic publication with a computer processor;
   determining a first object to be included in the document, the first object having characteristics;
   classifying the characteristics of the first object into a plurality of classes;
   describing a characteristic of the first object with a first semantic primitive, the first semantic primitive;
   identifying at least one class among a plurality of classes; wherein,
      each class among the plurality of classes is stored as metadata defining a document definition associated with the document;
   determining whether at least one characteristic of the first object belongs to the class identified by the first semantic primitive and whether or not there is a constraint on the use of the first object in the document;
      wherein when a constraint on the use of the first object in the document or a document template exists, a message is generated indicating a conflict and,
      wherein when a constraint on the use of the first object in the document or the document template does not exist, metadata associated with the first object and the first semantic primitive is used in generating a document model;
   generating a first document model, based on a result of the determination of the constraints and the document definition;
   publishing the document to a computer display using the computer processor,
      wherein updates to the first document model and document definition are reflected in the document when the document is published;
   receiving a request to modify the first object based on information associated with the business processing chain;
   modifying the first semantic primitive describing a characteristic of the first object and the document definition based on the request;
   modifying subsequent publications of the document based on the modified document definition;
   receiving a request to publish a second document associated with a second document model referencing the first object; and
   publishing the second document based on a second document model, the second document being published based on the modifications to the first object.

2. The computer-implemented method of claim 1, wherein the document is published without the first object based on determining that the first semantic primitive reflects a constraint on using the first object in the first document.

3. The computer-implemented method of claim 1, further including:
   receiving a request to modify the first object based on information associated with the business processing chain;
   modifying the first semantic primitive in the document definition based on the request; and
   modifying the publication of any document that references the first object based on the modified first semantic primitive.

4. The computer-implemented method of claim 1, wherein the first semantic primitive is defined within a document vocabulary associated with the document definition.

5. The computer-implemented method of claim 1, wherein the first semantic primitive identifies a class describing the relationship of the first object to a level in the business processing chain.

6. The computer-implemented method of claim 5, wherein the business processing chain level includes one of an editing level, a storage level, a translation level, and a publishing level.

7. The computer-implemented method of claim 1, wherein the first semantic primitive reflects a class describing the first object as one of an object defining a document style, an object associated with a document definition, an object not associated with a document definition, an object associated with a document type definition, an object that references other objects, and an object having a constraint with regard to a second semantic primitive class.

8. The computer-implemented method of claim 1, wherein the first semantic primitive reflects a class describing the first object as including content that is rendered in a content frame of an extended hypertext markup language object, an object that may be referenced by a public entity, and an object that is used for linking to other data.

9. The computer-implemented method of claim 1, wherein the first semantic primitive reflects a class describing the first object as an object including data files, an object generated from a source entity remote from the business processing chain, an object that may be reused by other documents, an object that may be modified, and an object including template data.

10. The computer-implemented method of claim 1, wherein the first semantic primitive reflects a class describing the first object as an object including data associated with at least one of: content as presented directly on a user interface, and objects defining graphical components used in the user interface.

11. The computer-implemented method of claim 1, wherein the first object is associated with a second semantic primitive reflecting a class describing a second characteristic of the first object with respect to the business processing chain.

12. The computer-implemented method of claim 1, wherein the first semantic primitive is associated with metadata of the first object.

13. A system for managing documents in a business processing chain associated with a first and second entity affiliated with a business entity, comprising:
a first computing system associated with the first entity and configured to generate a first object representing a document that references a second object,
wherein the first and second objects are associated with a respective semantic primitive, stored as metadata, associated with a characteristic of the respective object,
wherein the semantic primitives describe a respective characteristic of the first and second objects and the characteristic is classified into classes based on the object and describe the object's relationship with the business processing chain and,
wherein generating the first object includes determining whether the first object belongs to the class associated with a first semantic primitive selected from among the classified classes, the first semantic primitive reflecting a constraint to the first object's use in the first document,
when a constraint on the user of the first object in the document or a document template exists, a message is generated indicating a conflict, and
when a constraint on the use of the first object in the document or the document template does not exist, metadata associated with the first object and the first semantic primitive is used in generating a document model;
a second computing system associated with the second entity and configured to generate the second object; and
a third computing system configured to generate a document model based on the semantic primitives of the first and second objects and the existence of a constraint, and publish the document based on the document model,
wherein the third computing system modifies the publication of the document based on a change to any one of the first semantic primitive and a second semantic primitive, and
wherein publishing the document includes publishing the document on a computer display;
wherein the third computing system modifies a publication of a second document that references an object associated with any one of the changed semantic primitives.

14. The system of claim 13, wherein the change to any one of the first and second semantic primitives includes a change to the first semantic primitive resulting in a conflict with the first objects use in the document, and wherein the third computing system publishes the document without the first object based on the conflict.

15. The system of claim 13, wherein at least one of the first and second semantic primitives is a class describing, respectively, at least one of the first and second object's relationship to a particular level in the business processing chain, at least one of an object defining a document style, an object associated with a document definition, an object not associated with a document definition, an object associated with a document type definition, an object that references other objects, and an object having a constraint with regard to second semantic primitive class.

16. The system of claim 13, wherein the semantic primitives of the first and second objects are associated with metadata of the first object and second object, respectively.

* * * * *